(12) United States Patent
Vorona

(10) Patent No.: US 6,273,657 B1
(45) Date of Patent: Aug. 14, 2001

(54) ANCHORING DEVICE FOR SECURING A THREADED MEMBER TO A SUBSTRATE

(75) Inventor: Vladimir A. Vorona, Hollidaysburg, PA (US)

(73) Assignee: Penn Rail Systems, Inc.

( * ) Notice: Subject to any disclaimer, the term of this patent is extended or adjusted under 35 U.S.C. 154(b) by 0 days.

(21) Appl. No.: 09/473,430

(22) Filed: Dec. 29, 1999

(51) Int. Cl.⁷ .............................. F16B 37/04; F16B 39/02
(52) U.S. Cl. .............................. 411/82; 411/180; 411/429
(58) Field of Search ........................... 411/82, 82.1, 178, 411/180, 301, 302, 429; 52/DIG. 5, DIG. 12

(56) References Cited

U.S. PATENT DOCUMENTS

| | | | |
|---|---|---|---|
| 3,434,521 | * | 3/1969 | Flora .................................. 411/180 |
| 4,729,705 | * | 3/1988 | Higgins ............................ 411/180 X |
| 4,902,180 | * | 2/1990 | Gauron ................................ 411/82.1 |
| 4,941,788 | * | 7/1990 | Highfield ......................... 411/180 X |
| 4,993,900 | * | 2/1991 | Hugel et al. ........................ 411/82.1 |
| 5,078,562 | * | 1/1992 | DeHaitre .............................. 411/302 |

* cited by examiner

Primary Examiner—Neill Wilson
(74) Attorney, Agent, or Firm—Dechert

(57) ABSTRACT

An anchoring device for anchoring a threaded member in a substrate material. More particularly, an anchoring system for anchoring a threaded member in a substrate material, which anchoring system is designed to alleviate the stresses caused during use when water trapped within the anchoring system between an anchoring sheath and a threaded member expands upon freezing.

26 Claims, 5 Drawing Sheets

ANCHORING DEVICE FOR SECURING A THREADED MEMBER TO A SUBSTRATE

The present invention relates to an anchoring device for anchoring a threaded member in a substrate material. More particularly, the present invention is directed to an anchoring system for anchoring a threaded member in a substrate material, which anchoring system is designed to alleviate the stresses caused during use when water trapped within the anchoring system expands upon freezing.

Devices for fixing threaded members in a substrate material are known. These known devices typically comprise an anchoring sleeve designed to receive a threaded member and to be poured or otherwise incorporated into a substrate material (e.g. drilling a hole into the substrate material and adhering the anchoring sleeve therein).

These existing devices are plagued with failures resulting from the entrapment of water between the anchoring sleeve and the threaded member. Typically, water becomes entrapped in the anchoring sleeves in one of two ways. First, water may enter the anchoring sleeve during the manufacturing and shipping of the substrate material incorporating the anchoring sleeve (i.e., concrete railroad ties) before the threaded member is installed. Second, water may seep into the anchoring sleeve once the threaded member is installed through the interstices between the anchoring sleeve and the threaded member. If enough water becomes trapped between the anchoring sleeve and the threaded member, the force generated when that water expands upon freezing will be sufficient to cause the anchoring sleeve to fail (e.g., deform or fracture), which in turn will cause the surrounding substrate material to fail (e.g., fracture or crumble).

Accordingly, what is needed is an anchoring system for anchoring a threaded member in a substrate material which is designed to alleviate the stresses caused when entrapped water expands upon freezing.

SUMMARY OF THE INVENTION

The present invention provides an anchoring device for anchoring a threaded member in a substrate material. Specifically, the present invention provides an anchoring system designed to alleviate the stresses caused when water trapped within the anchoring system expands upon freezing.

The term substrate material as used herein includes, but is not limited to, concrete, plaster and epoxy.

The term threaded member as used herein includes screws, bolts and other threaded implements used to secure items to a substrate.

In accordance with one aspect of the present invention, an anchoring device for anchoring a threaded member in a substrate material is provided, having an anchoring sheath with a first end, a second end and a body portion disposed between the first end and the second end, wherein the body portion has an internal bore adapted to receive the threaded member and an internal cavity. In a preferred embodiment of this aspect of the present invention, the body portion also has at least one longitudinal rib extending outwardly from the body portion along at least a segment of the body portion. Preferably, the at least one longitudinal rib has a generally triangular cross-section. In another preferred embodiment, the body portion has at least two longitudinal ribs, wherein each longitudinal rib is disposed in a different plane intersecting a longitudinal axis of the anchoring sheath. Preferably, the body portion has three longitudinal ribs spaced around the body portion approximately 120° apart. In another preferred embodiment, the anchoring sheath optionally has a protective coating applied to at least part of its external surface.

In accordance with another aspect of the present invention, an anchoring system for anchoring a threaded member in a substrate material is provided, having (a) an anchoring sheath having a first end, a second end and a body portion disposed between the first end and the second end; wherein the body portion has an internal bore adapted to receive a threaded member and an internal cavity; and, (b) at least one compressible freeze protection element; wherein the internal cavity is adapted to retain the at least one compressible freeze protection element. In a preferred embodiment of this aspect of the present invention, the at least one compressible freeze protection element is at least partially compressed to facilitate its insertion into the internal cavity. In another preferred embodiment of this aspect of the invention, the at least one compressible freeze protection element is a single compressible element, preferably a single compressible element having a shape selected from the group consisting of a sphere, a cylinder, a polyhedron, more preferably, a sphere, a cylinder, a cube or a hexahedron; most preferably, a sphere. In another preferred embodiment, the at least one compressible freeze protection element is a plurality of individual compressible elements of the same general size and shape. In another preferred embodiment, the at least one compressible freeze protection element is a plurality of individual compressible elements of varying shapes and sizes.

In another aspect of the present invention, an anchoring system for anchoring a threaded member in a substrate material is provided, having: (a) an anchoring sheath with a first end, a second end and a body portion disposed between the first end and the second end; wherein the body portion has an internal bore adapted to receive a threaded member and an internal cavity; wherein the internal bore opens into the internal cavity; (b) at least one compressible freeze protection element disposed within the internal cavity; (c) an optional protective coating on at least a portion of an external surface of the anchoring sheath; and, (d) at least one longitudinal rib extending outwardly from the body portion along at least a segment of the body portion. In a preferred embodiment of this aspect of the present invention, the at least one freeze protection element is at least partially compressed to facilitate its insertion into the internal cavity through the internal bore.

In accordance with another aspect of the present invention, an anchoring device for anchoring a threaded member in a substrate material is provided, having: (a) an anchoring sheath with a first end, a second end and a body portion disposed between the first end and the second end; wherein the body portion has an internal bore adapted to receive a threaded member and an internal cavity; wherein the internal bore opens into the internal cavity; (b) three longitudinal ribs of generally triangular cross-section, extending outwardly from the body portion along at least a segment of the body portion and spaced around the body portion 120° apart; and, (c) a compressible freeze protection element disposed within the internal cavity, wherein the compressible freeze protection element is at least partially compressed to facilitate its insertion into the internal cavity; wherein the body portion has a top region extending part way from the first end towards the second end, which top region is devoid of longitudinal ribs.

In accordance with another aspect of the present invention, a method of anchoring a threaded member in a substrate material is provided, which method alleviates the concerns associated with the freeze and thaw cycle of water experienced in many geographic regions. Specifically, the present invention provides a method of anchoring a threaded member in a substrate material comprising: (a) incorporating into the substrate material an anchoring sleeve, which is designed to anchor the threaded member to the substrate material; by, for example, (a.1) forming the substrate material around the anchoring sleeve, or, alternatively (a.2) drilling a hole in the substrate material and adhering the anchoring sleeve into the hole using a suitable adhesive, preferably an epoxy; (b) inserting at least one compressible freeze protection element into the anchoring sleeve; and (c) threading the threaded member into the anchoring sleeve. In a preferred embodiment, the substrate material will comprise a concrete railroad tie or concrete slab and the threaded member will cooperate with a variety of known devices to secure a track rail to the concrete railroad tie or concrete slab. In another preferred embodiment, the anchoring sleeve is an anchoring sheath of the present invention.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the spirit and scope of the appended claims.

In the drawings.

DETAILED DESCRIPTION OF THE INVENTION

The following is a detailed description of the present invention. The description is not intended in a limiting sense, and it is made solely for the purpose of illustrating the general principles of the invention. The various features and advantages of the present invention may be more readily understood with reference to the following detailed description taken in conjunction with the accompanying drawings.

Figure 3:
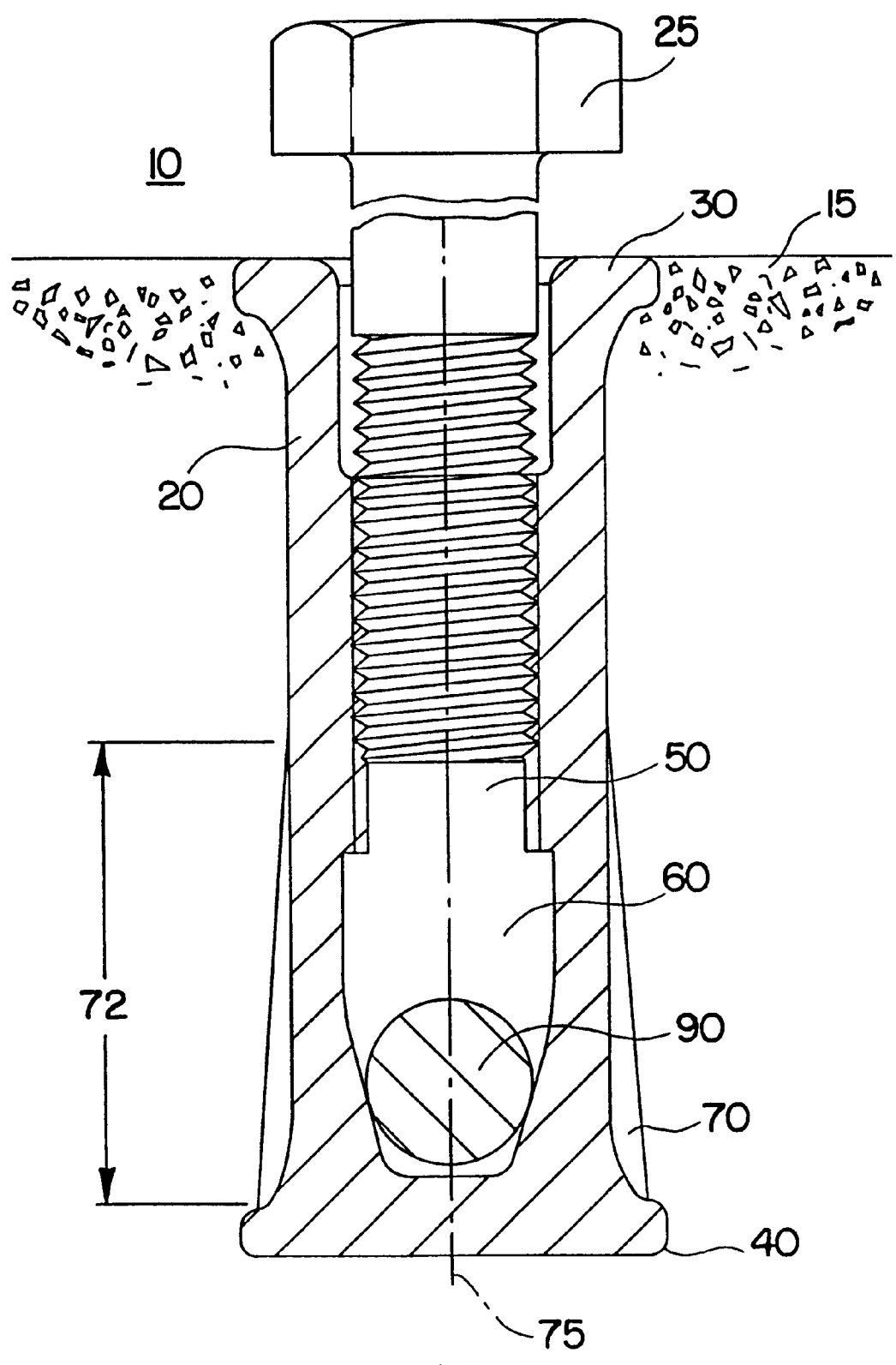
FIG. 3 is a cut away side view of an anchoring system according to the present invention.

FIG. 3 illustrates an anchoring system 10 of the present invention for use in anchoring a threaded member 25 in a substrate material 15. The anchoring system 10 includes an anchoring sheath 20 and at least one compressible freeze protection element 90. The anchoring sheath 20 has a first end 30, a second end 40 and a body portion 35; wherein the body portion has an internal bore 50 which is disposed between the first end and the second end and which is adapted to receive the threaded member 25. The anchoring sheath also has an internal cavity 60 which is adapted to retain the at least one compressible freeze protection element 90. In a preferred configuration, the internal bore 50 opens into the internal cavity 60 with the internal bore and the internal cavity intersecting at a plane 55. In a preferred aspect of this configuration, the cross-sectional area of the internal cavity 60 exceeds the cross-sectional area of the internal bore 50 at plane 55 where they intersect.

In a preferred embodiment, the anchoring system 10 is configured so that the threaded member 25 does not compress the at least one compressible freeze protection element 90 upon insertion of the threaded member 25 into the anchoring sheath 20.

In a preferred embodiment, the anchoring sheath 20 will optionally include one or more longitudinal ribs 70 extending outwardly from the body portion 35 along at least a segment 72 of the body portion 35. It is preferred that no two longitudinal ribs 70 lie in the same plane intersecting the longitudinal axis 75 of the anchoring sheath 20. It is believed that having longitudinal ribs 70 lie in different planes on the anchoring sheath 20 will allow the forces generated by the anchoring sheath 20 when a threaded member is threaded into or out of the anchoring sheath 20 to be distributed more evenly throughout the surrounding substrate material; thus, avoiding the concentration of such forces in a single plane which, it is believed, would enhance the potential for fracturing the substrate material. These longitudinal ribs 70 are believed will help meld the anchoring sheath 20 to the substrate material 15 such that the anchoring sheath tends not to rotate relative to the substrate material when the threaded member is threaded into or out of the anchoring sheath. Preferably, a top region 78 extending part way from the first end 30 towards the second end 40 will be devoid of longitudinal ribs 70. It is believed that the absence of longitudinal ribs in the vicinity of the surface, or top layer, of the substrate material will reduce the forces in this top layer. It is further believed that this top layer of the substrate material 15 is more susceptible to fracturing. In a most preferred embodiment, the anchoring sheath 20 will have three longitudinal ribs 70 spaced 120° apart around the body portion 35, see FIG. 2.

Figure 1:
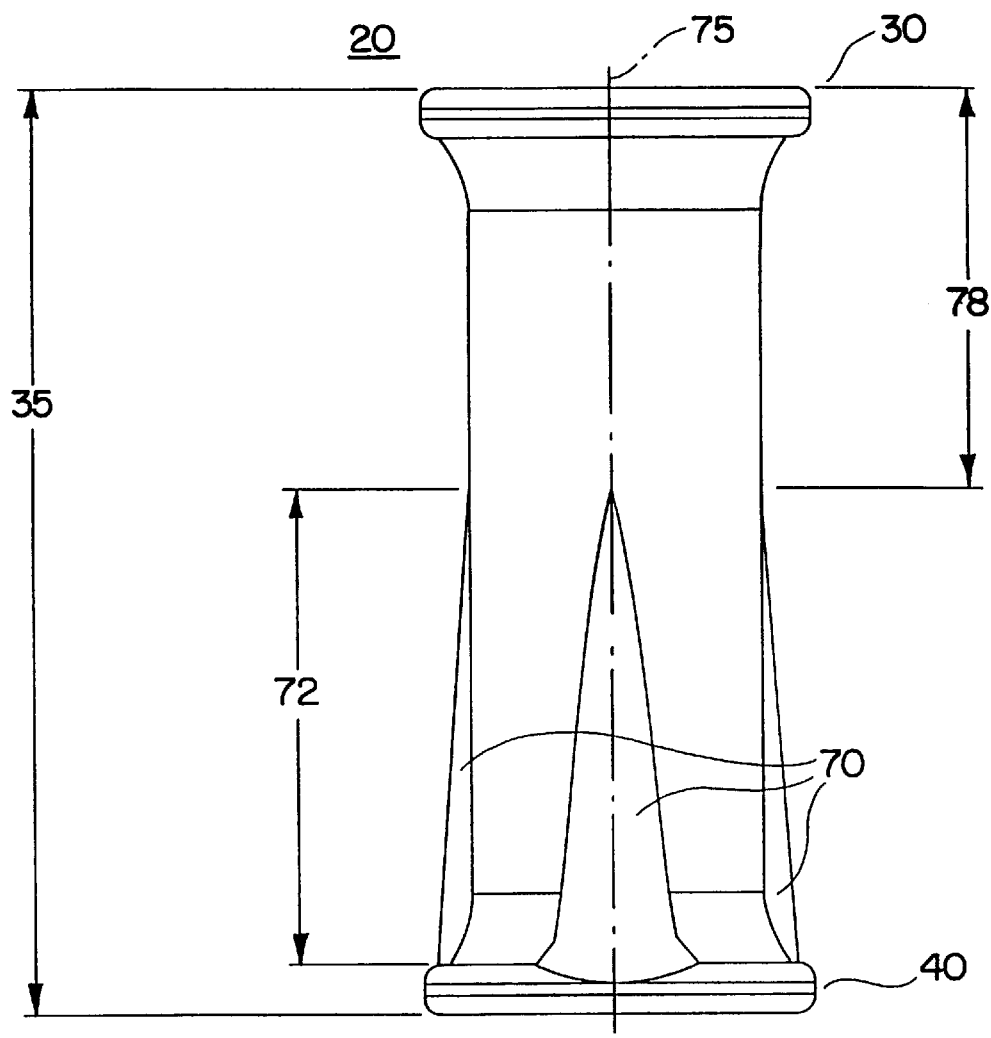
FIG. 1 is a side view of an anchoring sheath according to the present invention.
Figure 2:
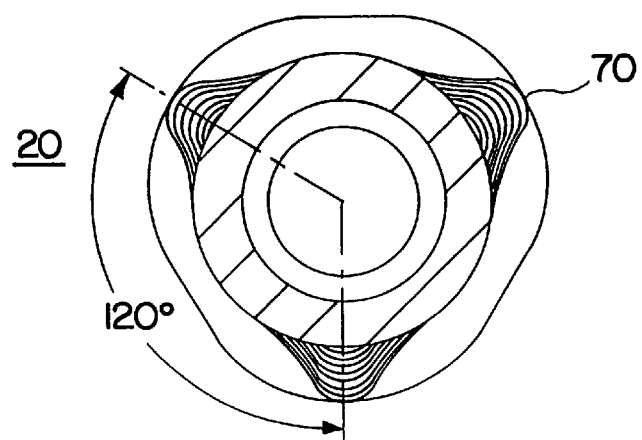
FIG. 2 is a cut away top view of a segment of the anchoring sheath of FIG. 1.

In a preferred embodiment, the at least one longitudinal rib 70 has a generally triangular cross-section as depicted in both FIGS. 1 & 2. FIG. 2 is a top view of segment 72 of the anchoring sheath 20 of FIG. 1 depicting longitudinal ribs 70 with elevational lines which illustrate how the longitudinal ribs gradually diminish as one moves from the second end 40 toward the first end 30. One skilled in the art will recognize that other shapes of longitudinal ribs are within the scope of the present invention.

In a preferred embodiment of the present invention, the internal surfaces which form the internal cavity 60 of the anchoring sheath 20 are smooth. Preferably, the internal surfaces will slope in the general direction of the first end. Most preferably, the internal surfaces will be slopped such that any water that collects in the internal cavity during use will expand, at least in part, in the direction of the first end upon freezing.

The anchoring sheath 20 may be constructed of any material suitable for a given application. It is preferred that the anchoring sheath 20 be made of a material that has a modulus of elasticity that is similar to that of the substrate material into which the anchoring sheath is intended to be incorporated. In a preferred embodiment of the present invention, the anchoring sheath 20 will be incorporated into concrete rail road ties. In this preferred embodiment, the anchoring sheath 20 will preferably be made of grade 1030 steel.

Figure 4:
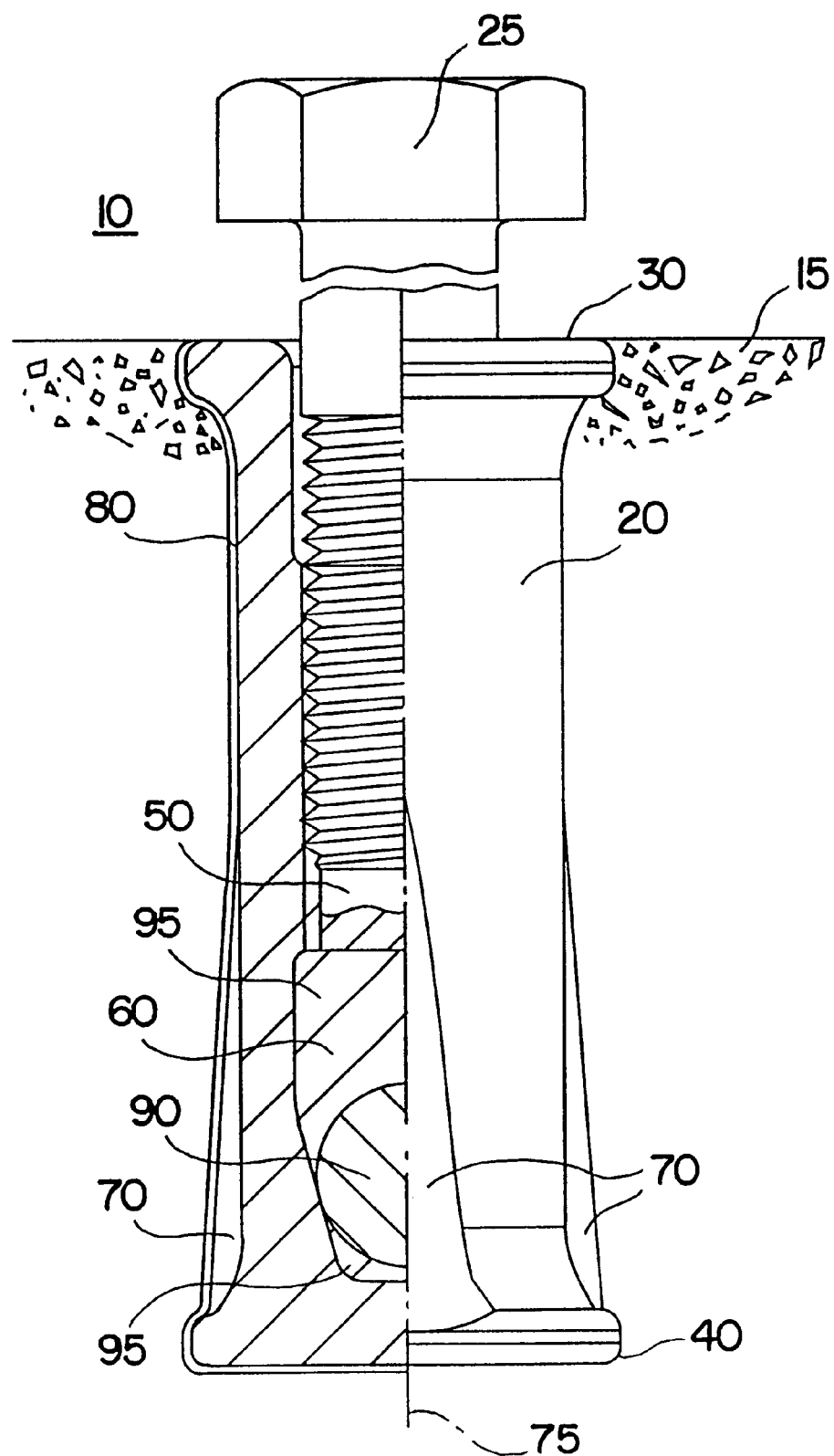
FIG. 4 is a axial half-section through an anchoring sheath of an anchoring system according to the present invention.

In another preferred embodiment of the present invention, the anchoring sheath 20 may further comprise a protective coating 80 applied to at least a portion of the external surface of the anchoring sheath, see FIG. 4. The protective coating preferably will comprise a resilient coating which may be applied to the anchoring sheath using any known method. For example, the protective coating may be applied by dipping the anchoring sheath into a pool of the protective coating. Alternatively, the protective coating may be sprayed or otherwise deposited onto the external surfaces of the anchoring sheath. Still further, the protective coating may be wrapped around the anchoring sheath and shrink wrapped thereon. The protective coating will preferably protect the anchoring sheath from certain physical or chemical stresses present in the environment in which the anchoring sheath will be used. For example, if the anchoring sheath is to be used in a corrosive chemical environment, the protective coating may comprise a substance which will defend the anchoring sheath from the chemical degradation which might otherwise result from exposure to this environment. Preferably, the protective coating 80 comprises a material selected from the group consisting of paint, powder coat material and epoxy; more preferably powder coat material; most preferably polymer powder coat material. A preferred polymer coat material is currently marketed by E & C under the brand Evertuff Polymer Powder Coating.

In use, the internal cavity 60 of the anchoring sheath 20 may collect water 95, see FIG. 4. In geographic regions where the ambient temperature occasionally drops below the freezing point of water, this collected water 95 may result in the failure of the anchoring sheath 20. That is, the water 95 collected in the anchoring sheath 20 will expand upon freezing, creating a force which may have sufficient energy to deform or fracture the anchoring sheath causing the surrounding substrate to fracture or crumble. The at least one compressible freeze protection element 90 alleviates this problem. That is, the at least one compressible freeze protection element 90 is designed to absorb the energy generated when water 95 trapped within the anchoring sheath 20 expands upon freezing.

The anchoring sheath 20 and the at least one compressible freeze protection element 90 of the present invention may be provided in a limitless number of shapes and sizes to suit a given application. One skilled in the art, given the disclosure provided herein and the design constraints imposed by the given application, will know how to select (a) a suitable volume for the internal cavity 60, (b) a suitable material of construction for the at least one compressible freeze protection element 90, and (c) a suitable size (i.e. non-stressed volume, Vns) for the at least one compressible freeze protection element 90 given (a) and (b). That is, one skilled in the art, given the design constraints imposed by a given application will be able to devise a suitable design for the anchoring sheath 20 including the volume of the internal cavity 60. Given this design, one skilled in the art will be able to determine the total volume, Vt, within the internal cavity 60 and within the internal bore 50 which will not otherwise be occupied by the threaded member 25 during use. The physical properties of water at varying temperatures and pressures are well known. Accordingly, one skilled in the art will also be able to determine the maximum volume of ice, Vice, which will be created when a given volume of water, Vw, freezes. One skilled in the art will further be able to select (a) a suitable material of construction for the at least one compressible freeze protection element 90 having a known or readily determinable compressibility factor, C, and (b) a suitable size (i.e. non-stressed volume, Vns) for the at least one compressible freeze protection element. For example, one skilled in the art will be able to use the following three equations to iteratively determine a suitable size and material of construction for the at least one compressible freeze protection element.

$$Vt \geq Vw + Vns$$

$$Vt \geq Vice - C * Vns$$

$$C \geq Vs/Vns$$

wherein Vs is the volume of the at least one compressible freeze protection element 90 when compressed using a force below the failure strength of the anchoring sheath (i.e. a force below that required to cause the deformation or fracture of the anchoring sheath). That is, for example, one skilled in the art may selectively choose a material of construction for the at least one compressible freeze protection element 90. Given the physical properties of the selected material of construction, one skilled in the art could then determine the minimum non-stressed volume, mVns, for the at least one freeze protection element 90 using the above equations.

The at least one compressible freeze protection element 90 may comprise any material of construction which satisfies the physical constraints imposed by a given application. Furthermore, if the anchoring system 10 is to be used in an adverse chemical environment, for example, a corrosive chemical environment, the material of construction will preferably comprise a substance which can withstand that environment without significant degradation. The term significant degradation as used herein means that level of degradation which would result in the failure of the at least one freeze protection element to protect the anchoring sheath 20 from the expansive force created when water 95 trapped in the internal cavity 60 expands upon freezing.

Figure 5:
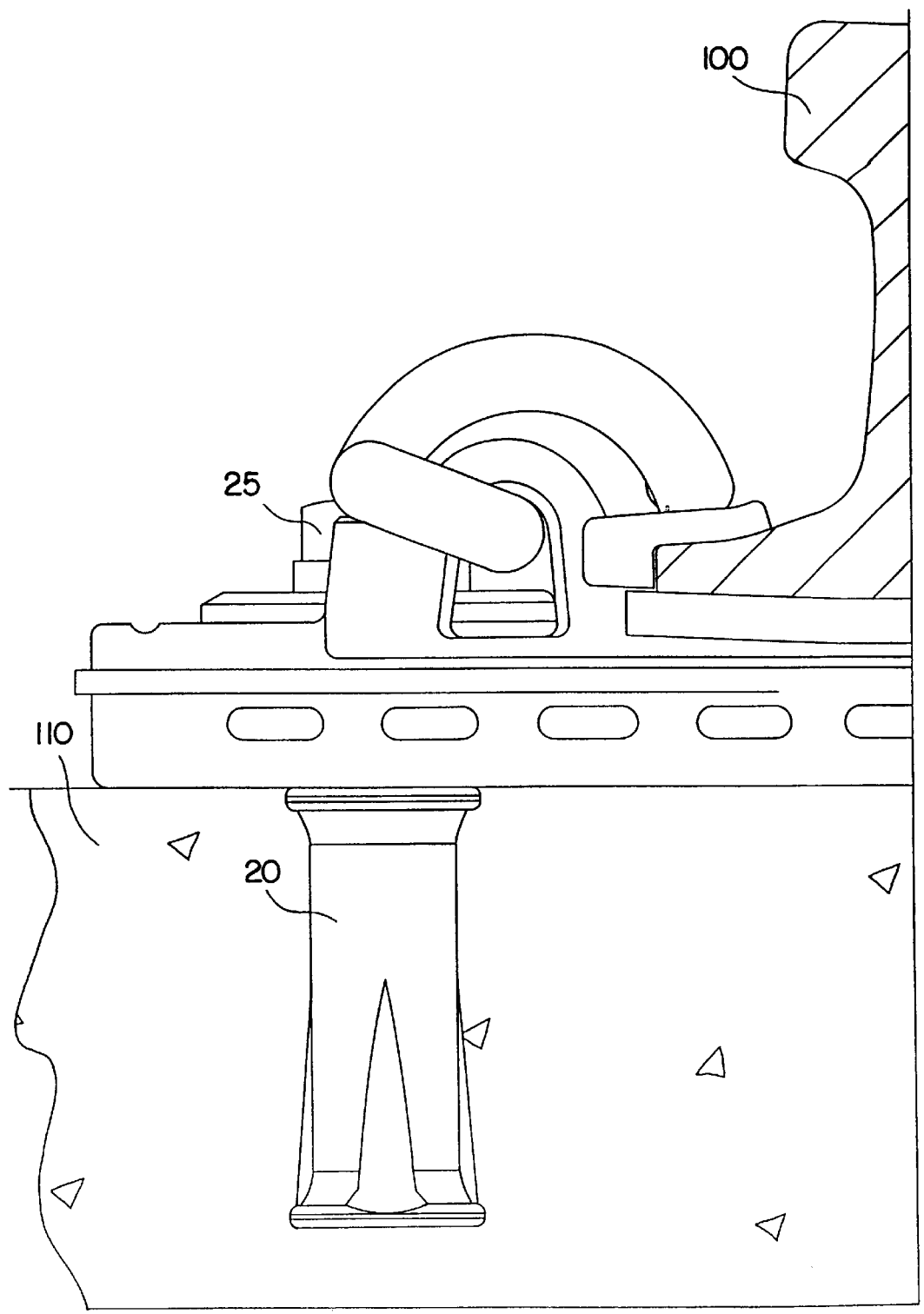
FIG. 5 is a depiction of an assembly attaching a track rail to a concrete railroad tie or concrete slab using an anchoring device according to the present invention; and, FIG. 6 is a cut away side view of an anchoring system according to the present invention with a plurality of individual compressible freeze protection elements having different shapes and sizes.
Figure 6:
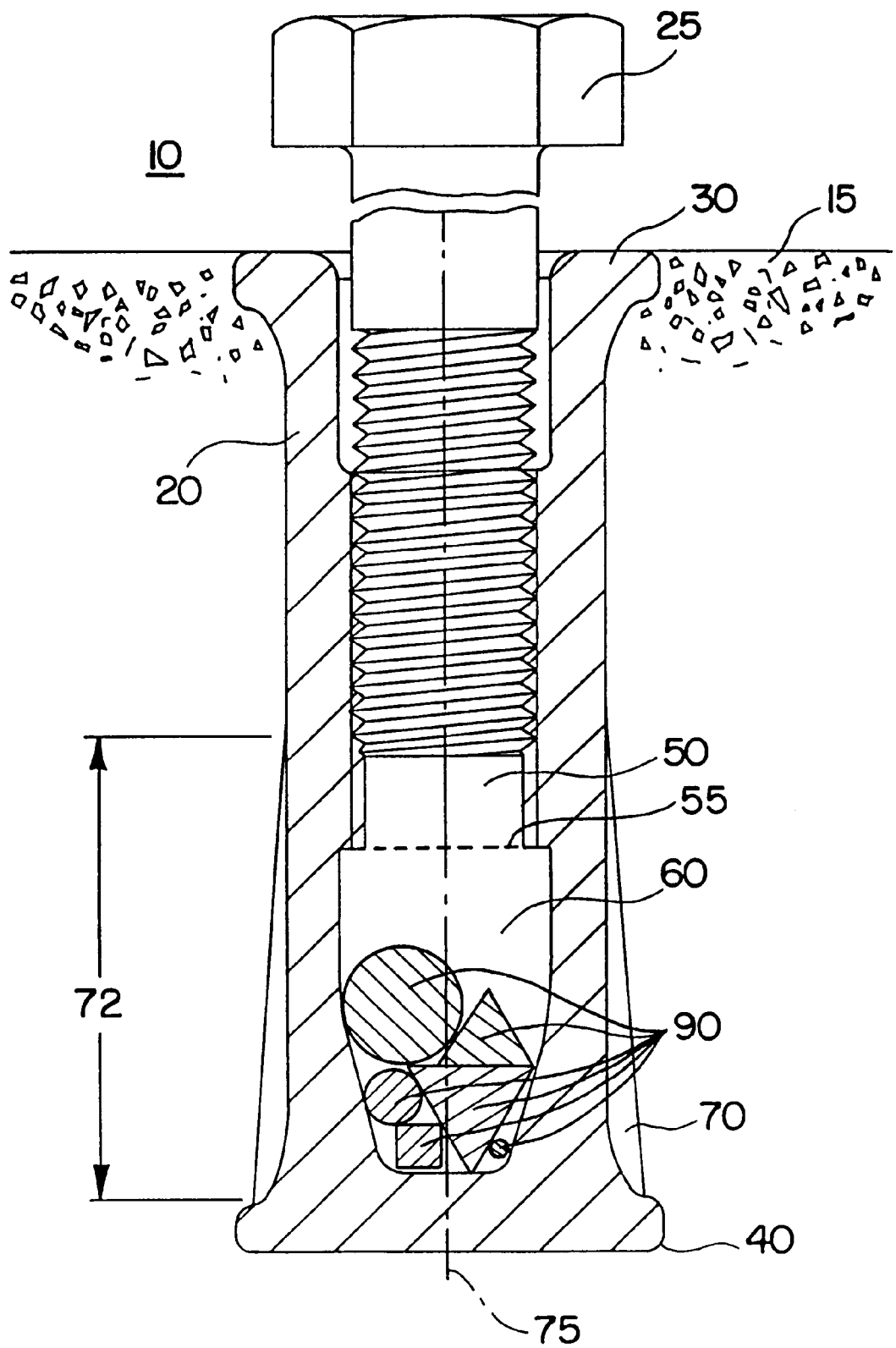

In a preferred embodiment, the anchoring system 10 of the present invention will be used to anchor a track rail 100 to a concrete railroad tie or concrete slab 110, see FIG. 5. In this preferred embodiment, the at least one compressible freeze protection element 90 preferably comprises a material of construction selected from the group consisting of foam, rubber and gel; more preferably, foam, cellular rubber; most preferably, microcellular polyurethane foam, polystyrene foam and NEOPRENE/EPDM/SBR—a mixture of neoprene rubber, ethylene propylene dyne monomer and styrene butadiene rubber. Microcellular polyurethane foam suitable for use with the present invention is currently available from BASF Corporation under the trade name Elastocell. Polystyrene foam suitable for use with the present invention is currently available from Dow Chemical as Blue Foam Board. A NEOPRENE/EPDM/SBR mixture suitable for use with the present invention is currently available from Rubberlite Incorporated distributed by Anchor Rubber as a cellular rubber under part number SCE45B.

In a preferred embodiment of the present invention, the at least one compressible freeze protection element 90 will comprise a single compressible element. In a preferred aspect of this embodiment, the single compressible element will have a shape selected from the group consisting of a sphere, a cylinder and a polyhedron; more preferably a sphere, a cylinder, a cube and a hexahedron; most preferably a sphere. In a preferred aspect of this embodiment, the at least one compressible freeze protection element 90 will be configured so that it is at least partially compressed to facilitate its insertion into the internal cavity 60 such that it will not be able to escape the internal cavity 60 under the influence of gravity alone. That is, once the at least one compressible freeze protection element 90 is inserted into the internal cavity 60 it will not simply fall out of the anchoring sheath 20 in the event the anchoring sheath 20 is inverted with the second end 40 having a higher elevation than the first end 30.

In another preferred embodiment the at least one freeze protection element may comprise a plurality of individual compressible elements having the same or varying shapes and sizes.

The present invention also provides a method for anchoring a threaded member in a substrate material, which method alleviates the concerns associated with the freeze and thaw cycle of water experienced in many geographic regions. The method comprises: (a) incorporating into a substrate material an anchoring sleeve, which is designed to anchor a threaded member to the substrate material; (b) inserting at least one compressible freeze protection element into the anchoring sleeve; and (c) threading the threaded member into the anchoring sleeve.

The anchoring sleeve may be incorporated into the substrate material using any number of methods. For example, the substrate material can be formed around the anchoring sleeve. For instance, if the substrate material comprises concrete, the concrete can be poured around the anchoring sleeve. Alternatively, the anchoring sleeve can be incorporated into the substrate material by, for example, drilling a hole into the substrate material and subsequently adhering the anchoring sleeve within the hole using a suitable adhesive.

In a preferred aspect of the method of the present invention, the anchoring sleeve comprises an anchoring sheath of the present invention.

In another preferred aspect of the method of the present invention, the method comprises a method for securing a rail track to a concrete railroad tie or concrete slab. Specifically, a method for securing a track rail to a concrete railroad tie or concrete slab, comprising: (a) incorporating into the concrete railroad tie or concrete slab an anchoring sleeve, which is designed to anchor a threaded member to the concrete railroad tie or concrete slab; (b) inserting at least one compressible freeze protection element into the anchoring sleeve; and (c) threading a threaded member into the anchoring sleeve; wherein the threaded member cooperates with a variety of known devices to secure the track rail to the concrete railroad tie or concrete slab. Preferably, the anchoring sleeve is an anchoring sheath of the present invention.

The present invention having been disclosed in connection with the foregoing embodiments, additional embodiments will now be apparent to persons skilled in the art. The present invention is not intended to be limited to the embodiments specifically mentioned, and accordingly reference should be made to the appended claims rather than the foregoing discussion, to assess the spirit and scope of the present invention in which exclusive rights are claimed.

In the claims:

1. An anchoring device for anchoring a threaded member in a substrate material, comprising: an anchoring sheath having a first end, a second end, a body portion disposed between the first end and the second end and at least two longitudinal ribs; wherein the body portion has an internal bore and an internal cavity, wherein the internal bore is adapted to receive the threaded member; and, wherein each longitudinal rib is disposed in a different plane intersecting a longitudinal axis of the anchoring sheath.

2. The anchoring device of claim 1, wherein at least one of the longitudinal ribs has a generally triangular cross-section.

3. The anchoring device of claim 1, having three longitudinal ribs spaced around the body portion 120° apart.

4. The anchoring device of claim 1, further comprising a protective coating on at least a portion of an external surface of the anchoring sheath.

5. The anchoring device of claim 4, wherein the protective coating is a polymer powder coating.

6. An anchoring system for anchoring a threaded member in a substrate material, comprising:
    (a) an anchoring sheath having a first end, a second end and a body portion disposed between the first end and the second end; wherein the body portion has an internal bore and an internal cavity; and,
    (b) at least one compressible freeze protection element; wherein the internal cavity is adapted to retain the at least one compressible freeze protection element and wherein the anchoring system is configured so that the threaded member does not compress the at least one compressible freeze protection element upon insertion of the threaded member into the anchoring sheath.

7. The anchoring system of claim 6, wherein the internal cavity is adapted to retain the at least one compressible freeze protection element and wherein the anchoring system is configured so that the threaded member does not compress the at least one compressible freeze protection element upon insertion of the threaded member into the anchoring sheath.

8. The anchoring system of claim 6, wherein the at least one compressible freeze protection element is at least partially compressed to facilitate its insertion into the internal cavity.

9. The anchoring system of claim 8, wherein the at least one compressible freeze protection element comprises a single compressible element.

10. The anchoring system of claim 9, wherein the single compressible element has a shape selected from the group consisting of a sphere, a cylinder and a polyhedron.

11. The anchoring system of claim 10, wherein the single compressible element has a shape selected from the group consisting of a sphere, a cylinder, a cube and a hexahedron.

12. The anchoring system of claim 8, wherein the at least one compressible freeze protection element comprises a plurality of individual compressible elements.

13. The anchoring system of claim 12, wherein the plurality of individual compressible elements have different shapes and sizes.

14. The anchoring system of claim 8, wherein the at least one compressible freeze protection element is made of a material selected from the group consisting of foam, rubber and gel.

15. The anchoring system of claim 8, wherein the at least one compressible freeze protection element is constructed of a material selected from the group consisting of microcellular polyurethane foam and polystyrene foam.

16. The anchoring system of claim 8, wherein the at least one compressible freeze protection element is constructed of microcellular polyurethane foam.

17. An anchoring device for anchoring a threaded member in a substrate material, comprising:
    (a) an anchoring sheath having a first end, a second end and a body portion disposed between the first end and the second end; wherein the body portion has an internal bore and an internal cavity; wherein the internal bore opens into the internal cavity and wherein the internal bore is adapted to receive the threaded member;
    (b) three longitudinal ribs of generally triangular cross-section, extending outwardly from the body portion along at least a segment of said body portion and spaced around the body portion 120° apart; and, (c) a compressible freeze protection element disposed within the internal cavity;

wherein the body portion has a top region extending part way from the first end towards the second end, which top region is devoid of longitudinal ribs.

18. The anchoring device of claim 17, wherein the compressible freeze protection element is at least partially compressed to facilitate its insertion into the internal cavity.

19. A method for anchoring a threaded member in a substrate material, comprising:

(a) incorporating an anchoring sleeve into the substrate material;

(b) inserting at least one compressible freeze protection element into the anchoring sleeve; and, (c) threading the threaded member into the anchoring sleeve.

20. The method of claim 19, wherein the threaded member does not compress the at least one compressible freeze protection element.

21. An anchoring device for anchoring a threaded member in a substrate material, comprising: an anchoring sheath having a first end, a second end, a body portion disposed between the first end and the second end; and at least one longitudinal rib extending outwardly from the body portion along at least a segment of the body portion; wherein the body portion has an internal bore adapted to receive the threaded member and an internal cavity; wherein a cross-sectional area of the internal cavity exceeds a cross-sectional area of the internal bore at a plane where the internal cavity and the internal bore intersect.

22. The anchoring device of claim 21, wherein the at least one longitudinal rib has a generally triangular cross-section.

23. The anchoring device of claim 21, having at least two longitudinal ribs, wherein each longitudinal rib is disposed in a different plane intersecting the longitudinal axis of the anchoring sheath.

24. The anchoring device of claim 21, having three longitudinal ribs spaced around the body portion 120° apart.

25. An anchoring device for anchoring a threaded member in a substrate material, comprising: an anchoring sheath having a first end, a second end, a body portion disposed between the first end and the second end and a protective coating on at least a portion of an external surface of the anchoring sheath; wherein the body portion has an internal bore adapted to receive the threaded member and an internal cavity; wherein a cross-sectional area of the internal cavity exceeds a cross-sectional area of the internal bore at a plane where the internal cavity and the internal bore intersect.

26. The anchoring device of claim 25, wherein the protective coating is a polymer powder coating.

* * * * *